Figure 1:
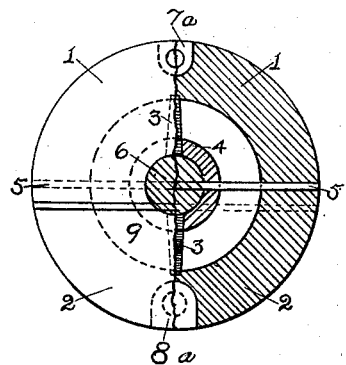
Figure 1:
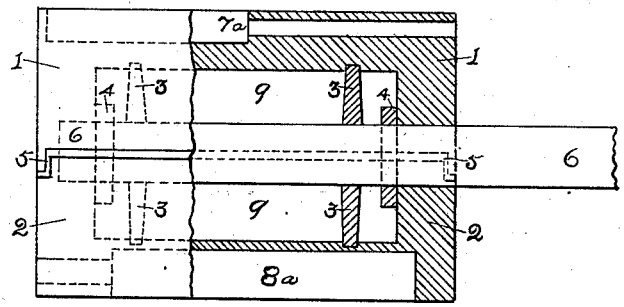

No. 654,511.  
Patented July 24, 1900.  
W. R. BOWKER & F. P. SHERMAN.  
WATER FEEDING AND AIR COMPRESSING MECHANISM FOR MOTOR VEHICLES.  
(Application filed Nov. 24, 1899.)  
(No Model.)  
4 Sheets—Sheet 1.

Witnesses.  
Wm Hilton  
John Rushton Bowker

Inventors.  
William Rushton Bowker  
Frank P Sherman  
by Geo H Evans atty.

No. 654,511. Patented July 24, 1900.
W. R. BOWKER & F. P. SHERMAN.
WATER FEEDING AND AIR COMPRESSING MECHANISM FOR MOTOR VEHICLES.
(Application filed Nov. 24, 1899.)
(No Model.) 4 Sheets—Sheet 2.

Witnesses.
Wm Hilton
John Rushton Bowker

Inventors.
William Rushton Bowker
Frank P Sherman
by Geo. H. Evans atty

No. 654,511. Patented July 24, 1900.
W. R. BOWKER & F. P. SHERMAN.
WATER FEEDING AND AIR COMPRESSING MECHANISM FOR MOTOR VEHICLES.
(Application filed Nov. 24, 1899.)
(No Model.) 4 Sheets—Sheet 3.
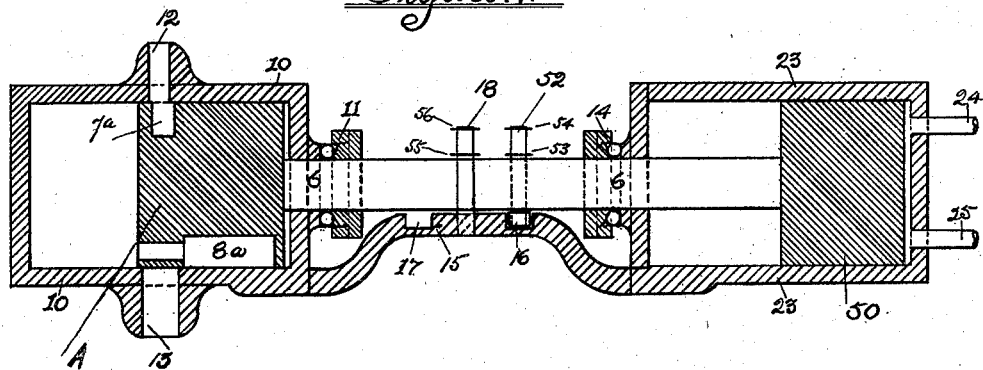
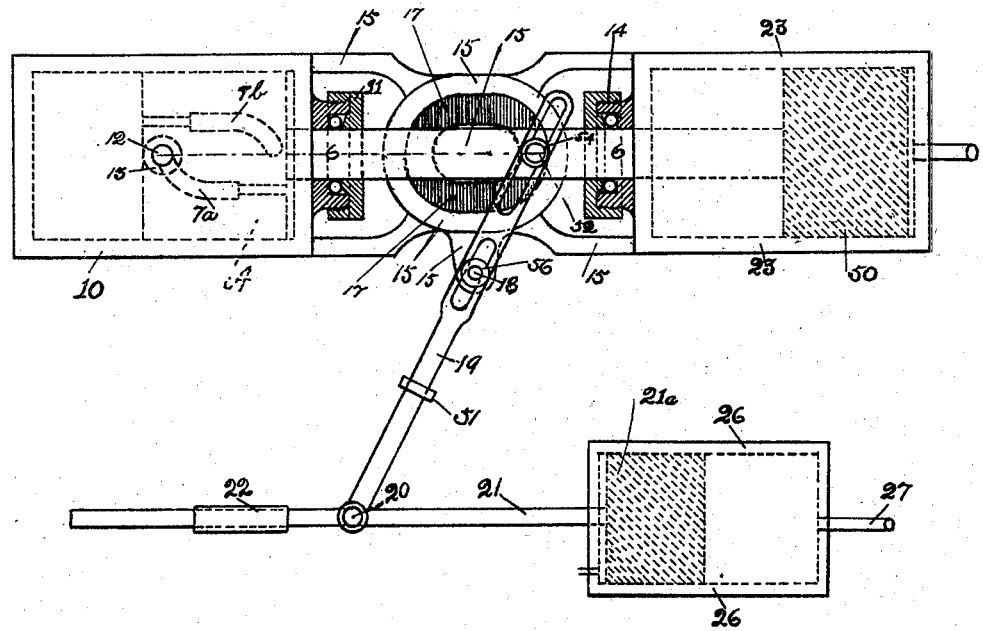
Witnesses
Wm Hilton
John Rushton Bowker
Inventors.
William Rushton Bowker
Frank P. Sherman
by Geo. H. Evans atty

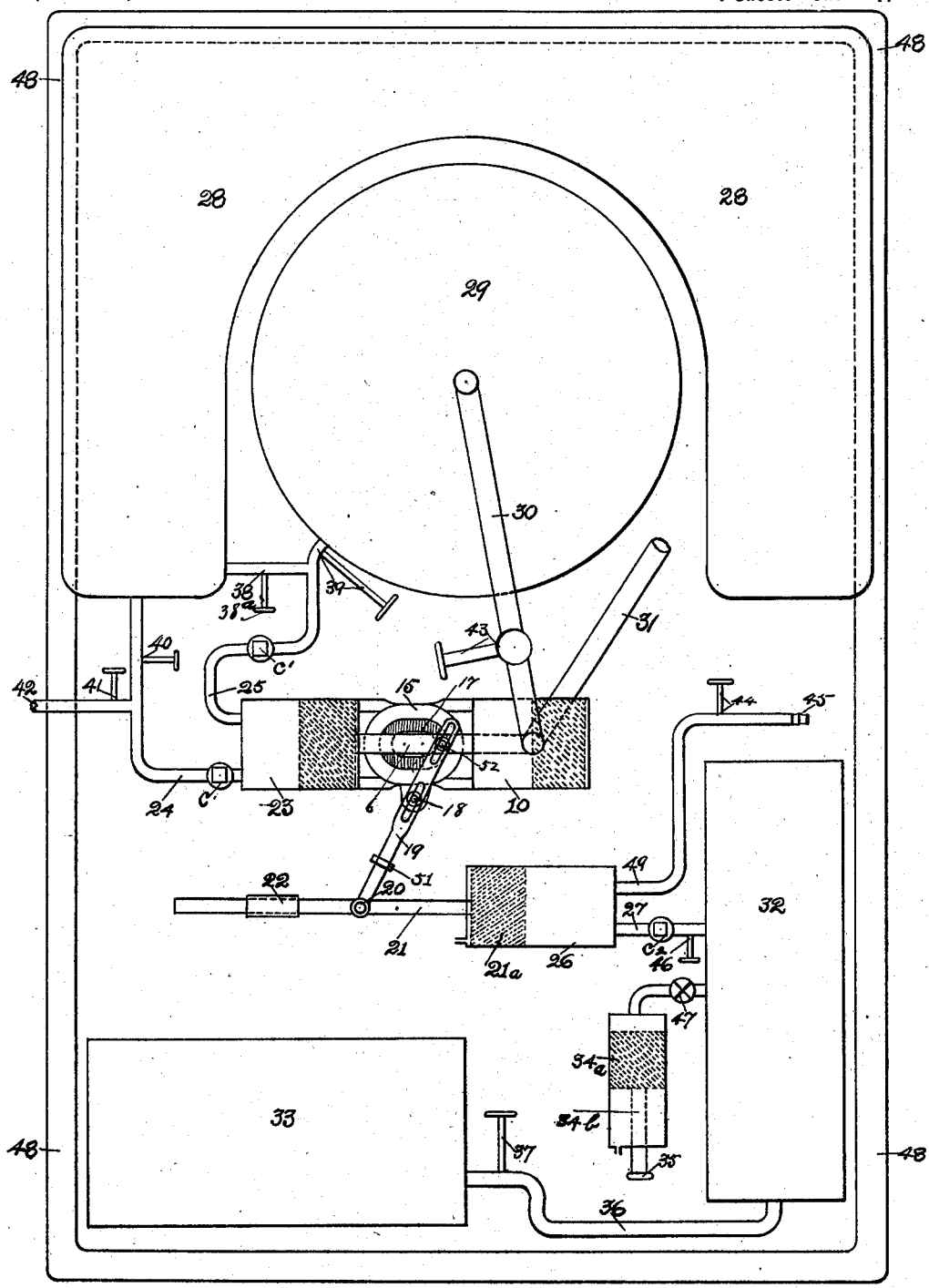

UNITED STATES PATENT OFFICE.

WILLIAM RUSHTON BOWKER AND FRANK P. SHERMAN, OF WALTHAM, MASSACHUSETTS.

WATER-FEEDING AND AIR-COMPRESSING MECHANISM FOR MOTOR-VEHICLES.

SPECIFICATION forming part of Letters Patent No. 654,511, dated July 24, 1900.

Application filed November 24, 1899. Serial No. 738,216. (No model.)

*To all whom it may concern:*

Be it known that we, WILLIAM RUSHTON BOWKER and FRANK P. SHERMAN, citizens of the United States, and residents of Waltham, Middlesex county, Massachusetts, have invented certain new and useful Improvements in Water - Feeding and Air - Compressing Mechanism for Motor-Vehicles, of which the following is a specification.

Our invention relates to mechanism for pumping water to the water-tank and from the tank or another source to the steam-boilers of motor-vehicles, and also for supplying compressed air for the gasolene-tank, tire-inflater, and brake mechanism. Heretofore in steam-motor vehicles the feed-water pump has been operated from the driving-shaft of the engine, so that the pump could only be operated while the vehicle was in motion, and the air-compressing mechanism for the gasolene-tank has heretofore been operated by hand and the brake mechanism by foot or hand. In such vehicles the tires have been inflated by means extraneous to the vehicle—for instance, by a hand-pump.

One object of our invention is to provide means for pumping the water into the steam-boiler from its tank while the vehicle is at rest or in motion or with a small head of steam or for pumping the water into boiler or tank from some external source or supply.

Further objects are to operate the air-pump of the compressed-air reservoir of the gasolene-tank from the same engine that operates the feed-water pump; also, to separably connect the same, so that one may be operated without the other instead of being simultaneously operated; also, to provide the air-pump with connections for inflating pneumatic tires; also, to provide a piston actuated from the compressed-air reservoir of the gasolene-tank to operate the brake mechanism of the vehicle.

These objects we attain by the mechanism shown in the accompanying drawings, in which—

Figure 2:
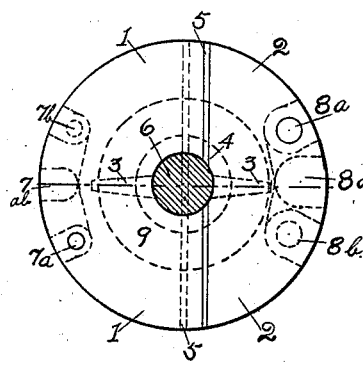
Figure 2:
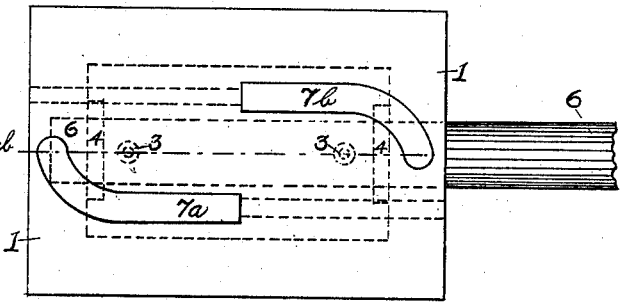
Figure 3:
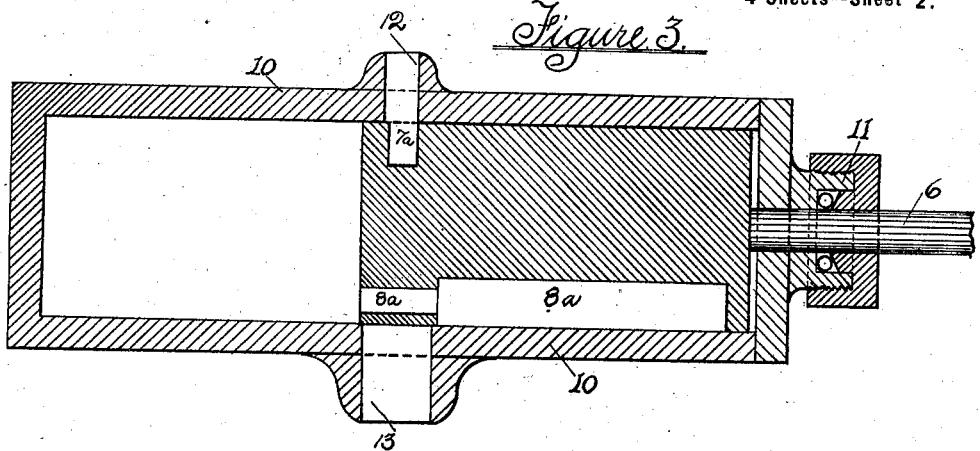
Figure 4:
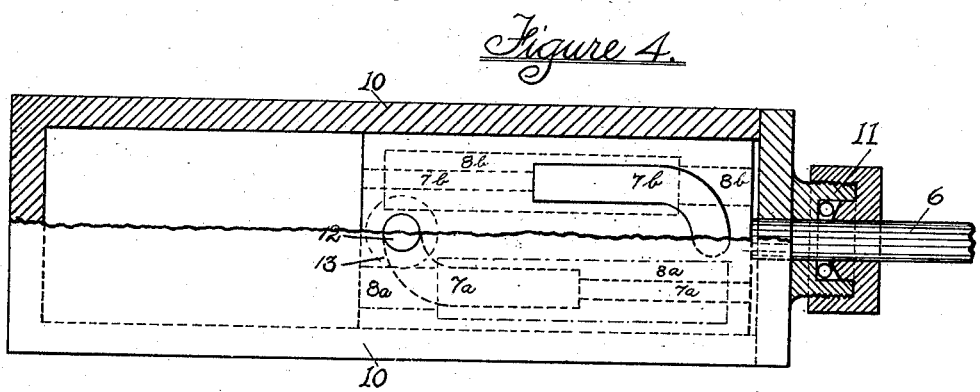
Figure 5:
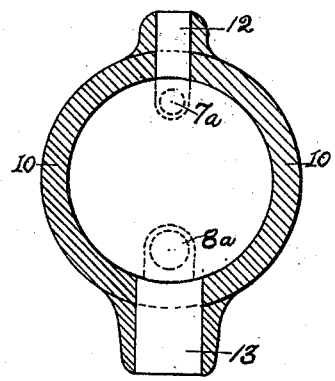
Figure 6:
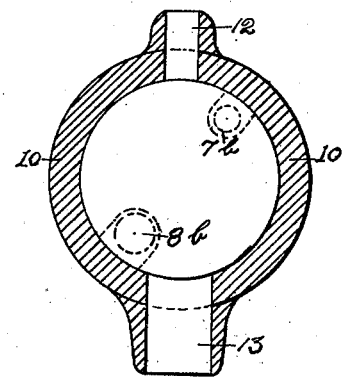

Figure 1 is a part longitudinal sectional elevation and end view of the engine piston-head and piston-rod. Fig. 2 is a plan and end view of the same. Fig. 3 is a longitudinal sectional elevation of the engine-cylinder with a different form or solid piston-head. Fig. 4 is a part sectional plan thereof. Figs. 5 and 6 are cross-sectional views through the engine-cylinder, showing the relative positions of the two steam inlet and two exhaust ports of the piston-head. Fig. 7 is a longitudinal sectional elevation of improved valveless engine and the feed-water pump connected therewith. Fig. 8 is a plan of the same, together with an air-pump separably connected with the engine-piston. Fig. 9 is a plan view of the mechanism shown in Fig. 8 in combination with the different apparatus of a steam-motor vehicle for which it is especially adapted.

10 is the engine-cylinder of the feed-water pump, and has at its middle diametrically-opposed inlet and exhaust ports 12 and 13, respectively, the former, as shown in Fig. 9, receiving steam through pipe 30 from the steam-boiler 29, and the latter exhausting into the exhaust-pipe 31. The boiler 29 supplies the motive force for the driving mechanism (not shown) of the vehicle.

The piston A of the engine-cylinder 10 is preferably formed in two hollow halves or sections 1 2, which meet on the line 5, as shown in Figs. 1 and 2, thereby forming an internal steam-chamber 9. The steam in the chamber 9 causes the sections 1 and 2 of the piston to move apart and closely fit the cylinder, which will prevent all tendency to stick. The piston-rod 6 has radially-projecting arms 3 3, the outer ends of which enter sockets in the piston-sections, so as to allow of such expansive action, and the piston-rod is further provided within the cylinder at its ends with rings or collars 4, which cause the piston and rod to move together. If desired, however, the piston A may be solid, as shown in Figs. 3 and 7. With the sectional piston there will be a slight loss of steam; but as the engine is quick-acting its loss will not be felt.

Both forms of piston are provided on the same side with surface grooves $7^a$ $7^b$, which constitute the inlet-ports. These grooves for the major portions of their lengths run parallel and lie at opposite sides of a common center line, (shown in dotted lines in Figs. 2 and 8;) but their inlet ends are curved inwardly to and intersect said lines. These inlet ends lie at opposite ends of the piston, so as to alternately register with the inlet-port 12, and from the discharge ends of the grooves passages are bored to the ends of the cylinder, so as to lead the steam from the grooves to and behind the cylinder ends. The exhaust-grooves $8^a$ $8^b$ are on the opposite sides of the piston and are diametrically opposite the inlet-ports $7^a$ $7^b$, respectively.

In order that the piston A may be partially rotated at each stroke to bring the proper inlet and exhaust ports into register with the inlet and exhaust openings 12 13 of the cylinder, and thus form a valveless engine, we provide the piston-rod 6 beyond its stuffing-box 11 with a fixed pin 52, having thereon at the lower end an antifriction-roller 16, which travels in an elliptical groove 17 of a guide 15. This pin-and-groove connection serves to partially rotate the piston in opposite directions, as it moves back and forth at the beginning of its two throws. (See Fig. 8.) As the piston moves from right to left, Fig. 8, the pin 52 will be forced into the far portion of groove 17, which will first rock or rotate the rod 6 and its piston A and then hold it in a straight path, and in the opposite movement the pin will be forced past the central line into the near portion of the groove and rotate the piston oppositely. This rotation of the piston by the curved ends of groove 17 will cause its inlet-grooves $7^a$ $7^b$ to be brought alternately into register with the inlet-port 12, and they will be kept in register therewith throughout the entire lengths of their grooved portions by the straight portions of the groove 17. By reason of these curved ports $7^a$ $7^b$ they will take steam on the position of dead-center, which keeps the piston-head in continuous motion or keeps it in action continuously so long as there is a supply of steam.

Referring to Fig. 5, it will be seen that steam is entering the cylinder 10 through the inlet-port $7^a$ of the piston and exhausting through port $8^a$, and the positions of ports $7^b$ $8^b$ at this time are shown in Fig. 6. In Fig. 2 (end view) the rotary travel of the piston is to bring its ports to the common central line $7^{ab}$ $8^{ab}$, as shown by dotted lines.

Beyond the pin 52 and roller 16 the piston-rod 6 enters the feed-water-pump cylinder 23 through a stuffing-box 14 and is provided with a piston 50, which draws in water through inlet-pipe 24 and discharges it through outlet-pipe 25. These two pipes, as shown in Fig. 9, are provided with check-valves $c$ $c'$, respectively, operating as usual. The inlet-pipe 24 extends to the water-tank 28 and also has a branch pipe 42, adapted for connection with a hydrant or other water-supply. The pipe 42 has a valve 41, and the pipe 24 has a valve 40 between tank 28 and pipe 42. The pipe 25 leads from the pump-cylinder 23 to the steam-boiler 29 to feed the same with water, and next to the boiler a valve 39 is provided. Just beyond this valve 39 the pipe 25 is connected to the tank 28 by a pipe 38, having a valve $38^a$. The cylinders 10 and 23 are connected by the guide 15, which may be integral therewith or a separate casting.

Parallel with the pump-cylinder 23 is the air-pump cylinder 26, having its outlet-pipe 27 provided with a check-valve $c^2$ and connected to the compressed-air reservoir 32, which in turn is connected with the gasolene-tank 33 by a pipe 36, having a controlling-valve 37. This tank 33 supplies the fuel to the furnace (not shown) of boiler 29. Within the air-pump cylinder 26 is a piston $21^a$, the rod 21 of which passes through a suitable guide 22 on the framework. The piston-rod 21 is connected to the piston-rod 6 by a lever 19, having a longitudinal slot between the ends through which passes a fulcrum-pin 18, having collars 56 57 and mounted on a lug projecting from the guide 15. One end of the lever 19 is also slotted to receive the upper end of pin 52 of piston-rod 6, by which it is rocked, this pin being of a length to keep it in the groove 17 and in engagement also with lever 19, at opposite sides of which are the collars 53 54. The opposite end of lever 19 is separably pivoted at 20 to the piston-rod 21, and between the removable pivot 20 and the fulcrum 18 the lever 19 is provided with a hinged joint, as at 51, so that by removing pivot 20 and swinging the end of lever 19 on its hinge 51 the air-compressing pump may be disconnected from the feed-water pump.

In order that the pneumatic vehicle-tires may be inflated, we provide the air-pump cylinder with a pipe 49, having a controlling-valve 44 and a nozzle or nipple 45, adapted for connection with a length of tubing leading to the tire-valves.

The compressed-air reservoir 32 is further connected with a brake-cylinder 34 by a short pipe having a valve 47. This brake-cylinder has a piston $34^a$, provided with a piston-rod $34^b$, the outer end of which engages a brake-lever 35, adapted to apply the wheel-brakes. (Not shown.) 48 represents the framework for supporting the various mechanisms above described.

The operation is as follows: The throttle-valve 43 being opened steam will flow into cylinder 10 (see Figs. 7 and 8) and through port $7^a$ behind the right-hand end of piston A, which will move the piston longitudinally from right to left, and the roller and guide 16 15 will cause the piston to rotate when it reaches the end of the stroke and bring the port $7^b$ into connection with the steam-inlet 12. In so moving from right to left the exhaust-port $8^a$ will conduct any steam in left-hand end of cylinder to the exhaust-port 13 and pipe 31. In the opposite movement of the piston A the port $8^b$ will exhaust the steam while the piston is moved from left to right by the live steam passing through port $7^b$. We thus do away with the steam chest and valves usually employed with steam-engine cylinders. To pump water only, the lever 19 is disconnected from piston-rod 21. To pump water from an external source into the tank 28, a hose is attached to the pipe 42 and valves 39 and 40 are closed and valves 41 and 38ª are opened; but to pump water from such external source directly into the boiler 29 the valves 38ª and 40 are closed and valves 41 and 39 are opened. To pump water from tank 28 into boiler 29, close the valves 41 and 38ª and open valves 40 and 39. To pump air without pumping water into the tank or the boiler, the lever 19 is connected to pump-rod 21, valves 41 39 are closed, and valves 40 and 38ª are opened. This causes a water circulation from the tank back into the tank through valves 40 and 38ª. To pump air into pneumatic tires, make the connection at 45, close valve 46 and open valve 44. To pump air into reservoir 32, close valve 44 and open valve 46. By opening valves 36 and 37 air may be pumped direct to the gasolene-tank 33, and by closing valve 37 and opening valve 46 47 air may be pumped direct to the brake-cylinder 34. By closing valves 37 and 47 compressed air may be stored in the reservoir 32, and by opening valves 44 and 46 air may be pumped simultaneously into the reservoir 32 and through pipe 49 to the tires. By proper manipulation of the various valves water and air may be pumped simultaneously to the desired points or places.

It is possible to pump water to the boiler while the vehicle is at rest, as well as while in motion, since the feed-water pump is operated from its own valveless engine and not from the drive-shaft of the main propelling-engine. This is very advantageous, for sometimes there is not a sufficient head of steam to propel the vehicle, and so water could not be pumped from the drive-shaft. We can pump water or air at any time by our improved mechanism and no foot or hand pumps are required for any of the tanks or reservoirs, tires, or brake mechanism.

What we claim is—

1. The combination, in a motor-vehicle, with the main steam-boiler and water-tank, of a steam feed-water pump deriving steam from said boiler, a discharge-pipe leading from the pump to the boiler, an inlet-pipe 24 connecting the pump with the tank, and provided with a valve 40, and a supply-pipe 42 connected to the said inlet-pipe 24 and provided with a valve 41; whereby by closing valve 40 and opening valve 41, water may be supplied direct to the boiler from pipe 42, or by closing valve 41 and opening valve 40, the boiler may be supplied from the tank; substantially as described.

2. The combination, in a motor-vehicle, with the main steam-boiler, and water-tank, of a steam feed-water pump deriving steam from the main boiler, a discharge-pipe 25 leading from the pump to the boiler, and provided with a valve 39, a short pipe 38 having a valve 38ª and connecting the tank with the pipe 25 between the pump and valve 39, an inlet-pipe 24 leading from the tank to the pump and provided with a valve 40, and a supply-pipe 42, having a valve 41, and connected to the pipe 24 between the valve 40 and the pump; whereby water may be fed to the boiler from the tank or the supply-pipe, or by closing valves 41, 39, and opening valves 40, 38, the water may be simply kept in circulation between the pump and tank; substantially as described.

3. In a motor-vehicle, the combination with a steam feed-water pump, of an air-compressing pump, a lever connecting the piston-rods of the two pumps and having a hinged section separably connected to one of said piston-rods; substantially as described.

4. In a motor-vehicle, the combination with a steam feed-water pump, of an air-compressing pump operatively connected therewith, a compressed-air reservoir having a valved connection with the air-pump, and an auxiliary valved pipe leading from the air-pump; substantially as described.

5. In a motor-vehicle, the combination with a steam feed-water pump, of an air-compressing pump operatively connected therewith, a compressed-air cylinder having a valved connection with the air-pump, and also having a valved connection with a brake-cylinder; substantially as described.

In testimony whereof we affix our signatures in presence of two witnesses.

WILLIAM RUSHTON BOWKER.
FRANK P. SHERMAN.

Witnesses:
JOHN R. BOWKER,
BYRON B. JOHNSON.